US012316013B1

(12) United States Patent
Salem et al.

(10) Patent No.: US 12,316,013 B1
(45) Date of Patent: May 27, 2025

(54) ULTRA-BROADBAND CURRENT SHEET ARRAY

(71) Applicant: BAE Systems Space & Mission Systems Inc., Broomfield, CO (US)

(72) Inventors: Matthew G. Salem, Westminster, CO (US); Jason P. Moon, Broomfield, CO (US); Ileana C. Newhall, Longmont, CO (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 444 days.

(21) Appl. No.: 17/826,496

(22) Filed: May 27, 2022

Related U.S. Application Data

(60) Provisional application No. 63/194,072, filed on May 27, 2021.

(51) Int. Cl.
*H01Q 21/26* (2006.01)
*H01Q 1/48* (2006.01)
*H01Q 9/28* (2006.01)

(52) U.S. Cl.
CPC ............... *H01Q 21/26* (2013.01); *H01Q 1/48* (2013.01); *H01Q 9/28* (2013.01)

(58) Field of Classification Search
CPC ............... H01Q 1/38-48; H01Q 9/285; H01Q 21/0025; H01Q 21/062; H01Q 21/065; H01Q 21/26
See application file for complete search history.

(56) References Cited

U.S. PATENT DOCUMENTS

| | | | |
|---|---|---|---|
| 4,907,006 A | 3/1990 | Nishikawa | |
| 6,300,909 B1 | 10/2001 | Tsubaki | |
| 10,033,100 B1 * | 7/2018 | Chayat | H01Q 9/20 |
| 10,177,451 B1 | 1/2019 | Baraban | |
| 12,072,623 B2 * | 8/2024 | Shi | H01Q 21/065 |
| 12,107,350 B2 | 10/2024 | Lee et al. | |
| 2004/0036653 A1 | 2/2004 | Ishihara | |

(Continued)

FOREIGN PATENT DOCUMENTS

| | | |
|---|---|---|
| CN | 113078448 | 7/2021 |
| EP | 3843208 | 9/2023 |

(Continued)

OTHER PUBLICATIONS

Notice of Allowance for U.S. Appl. No. 17/537,758, dated Feb. 21, 2023 8 pages.

(Continued)

*Primary Examiner* — Hasan Islam
(74) *Attorney, Agent, or Firm* — Sheridan Ross P.C.

(57) ABSTRACT

Systems and methods for providing a broadband antenna are disclosed. The antenna can include a current sheet array having a plurality of antenna elements. Each antenna element includes dipole arms. The dipole arms can be configured as first and second dipole arm pairs for transmitting or receiving signals of different polarizations. A resistive-capacitive (RC) loading structure is provided for each antenna element, in a layer between the antenna elements and a surface of an antenna substrate. Each RC loading structure includes a set of conductive surfaces and a set of resistive surfaces. A dielectric layer separates the RC loading structure elements from the dipole arms.

10 Claims, 4 Drawing Sheets

(56) References Cited

U.S. PATENT DOCUMENTS

| | | | |
|---|---|---|---|
| 2004/0104860 | A1 | 6/2004 | Durham et al. |
| 2004/0140935 | A1 | 7/2004 | Korva |
| 2006/0066488 | A1 | 3/2006 | Zhinong |
| 2006/0227052 | A1 | 10/2006 | Tavassoli Hozouri |
| 2012/0154237 | A1 | 6/2012 | Ying |
| 2017/0338558 | A1 | 11/2017 | West |
| 2018/0205134 | A1 | 7/2018 | Khan et al. |
| 2018/0316098 | A1 | 11/2018 | Amadjikpe |
| 2019/0013585 | A1 | 1/2019 | Iida |
| 2019/0027838 | A1 | 1/2019 | Paulotto |
| 2019/0157768 | A1 | 5/2019 | Liu |
| 2019/0334246 | A1 | 10/2019 | Obata |
| 2020/0006842 | A1 | 1/2020 | Zhu |
| 2020/0076055 | A1 | 3/2020 | Jeon |
| 2020/0194894 | A1 | 6/2020 | Yanagi et al. |
| 2020/0266528 | A1 | 8/2020 | Nikolayev et al. |
| 2021/0013627 | A1 | 1/2021 | Goto et al. |
| 2021/0091473 | A1 | 3/2021 | Lee |
| 2021/0091476 | A1 | 3/2021 | Judd |
| 2021/0098894 | A1 | 4/2021 | Haviv |
| 2022/0140464 | A1 | 5/2022 | Tenno |
| 2022/0173506 | A1 | 6/2022 | Okabe et al. |
| 2022/0359988 | A1 | 11/2022 | Yoshikawa |
| 2022/0393705 | A1 | 12/2022 | Lee |
| 2022/0407233 | A1 | 12/2022 | Woo |
| 2023/0021498 | A1 | 1/2023 | Yoshikawa |
| 2023/0046168 | A1 | 2/2023 | Byun |
| 2023/0084538 | A1 | 3/2023 | Mu |
| 2023/0101577 | A1 | 3/2023 | Yong |
| 2023/0216178 | A1 | 7/2023 | Choi |
| 2023/0420830 | A1 | 12/2023 | Papantonis |

FOREIGN PATENT DOCUMENTS

| | | |
|---|---|---|
| WO | WO 2010/049984 | 5/2010 |
| WO | WO 2021/085665 | 5/2021 |

OTHER PUBLICATIONS

Official Action for U.S. Appl. No. 17/391,897, dated Feb. 1, 2024 18 pages.

Official Action for U.S. Appl. No. 17/391,897, dated Jun. 4, 2024 10 pages.

Notice of Allowance for U.S. Appl. No. 17/391,897, dated Sep. 3, 2024 13 pages.

* cited by examiner

ULTRA-BROADBAND CURRENT SHEET ARRAY

CROSS-REFERENCE TO RELATED APPLICATIONS

This application claims the benefit of U.S. Provisional Patent Application Ser. No. 63/194,072, filed May 27, 2021, the entire disclosure of which is hereby incorporated herein by reference.

FIELD

The present disclosure is generally related to antennas and more particularly to current sheet arrays.

BACKGROUND

The development of two-dimensional planar broadband antennas has long been investigated. Typically, current sheet arrays are chosen over Vivaldi and loaded slot designs as current sheet arrays have a reduced depth, dual polarization (i.e., horizontal and vertical polarization) and small 2D element spacing. Conventional current sheet arrays comprise three modes: a radiating resonant mode, a non-radiating common mode, and a radiating dipole mode. The radiating resonant mode is generally driven by the height of the array, the lattice spacing, and the capacitance between elements. The dipole mode is driven by the lattice spacing. Generally, the lattice size is chosen to fix the dipole mode and the height and capacitance are chosen to fix the resonant mode. Under normal circumstances, the non-radiating common mode existing in conventional current sheet arrays occurs at a frequency between the radiating resonant and dipole modes. This common mode thus reduces the effective bandwidth of the antenna. Many attempts have been made to mode or eliminate the common mode in order to connect the two radiating modes and produce an extremely wideband antenna.

In order to increase the bandwidth of a current sheet array, one approach is to increase the capacitance between elements. This has been done by overlapping elements or by interleaving or interdigitating portions of the planar elements in a horizontal plane. However, the increases in capacitance and in antenna performance using such approaches has been limited.

Other conventional current sheet arrays have been developed using BALUN-fed current sheet arrays in which the common mode is removed, allowing for wideband performance. However, this wideband performance comes at the expense of increased circuitry, a more difficult build procedure and a larger depth of the current sheet array. The inclusion of a BALUN with a current sheet array makes the integration with a complex feed network very difficult to manufacture.

Another approach is to use shorting posts to reduce the electrical length of the resonant and common mode loops. By doing this both of these modes move higher in frequency. Although wideband performance can still be achieved, the antenna is no longer electrically small compared to its radiation band.

What is desired is a current sheet array in which the common mode is eliminated without the negative aspects existing in conventional current sheet arrays. A current sheet array that is also dual polarized, small in size, easy to manufacture, capable of being curved to fit conformal applications, with no non-radiating common mode, is desired.

SUMMARY

Embodiments of the present disclosure provide current sheet array antennas with broadband characteristics, and methods to broadband current sheet array antennas by using resistive-capacitive (RC) loading to de-Q the resonant mode of the antenna. This increases the bandwidth of the resonant mode, with some reduction in efficiency. Embodiments of the present disclosure can provide an antenna element design that includes a number of unit cells or elements. The present disclosure enables a broad bandwidth.

In accordance with embodiments of the present disclosure, a current sheet array antenna is formed using typical coupled dipole elements. As with other coupled dipoles, a resonant loop is formed by balancing the capacitance between elements with the inductance of the loop. Embodiments of the present disclosure add an RC loading plate to the standard current sheet array to extend the bandwidth of the resonant mode. This RC loading plate includes of a mix of conductive and resistive components. The effect of this structure on element bandwidth and efficiency is to significantly increase bandwidth, while slightly decreasing average efficiency.

An element incorporating dipole arms as disclosed herein can be manufactured singly or as part of an array of elements using common printed circuit board (PCB) techniques. For example, the ground plane, the RC loading plate, and the dipole elements can be formed from conductive layers of a multi-layer board or structure. Accordingly, embodiments of the present disclosure can be manufactured simply and inexpensively using traditional PCB build processes.

Additional features and advantages of embodiments of the disclosed antenna and/or array systems and methods will become more readily apparent from the following description, particularly when taken together with the accompanying drawings.

DETAILED DESCRIPTION

Figure 1:
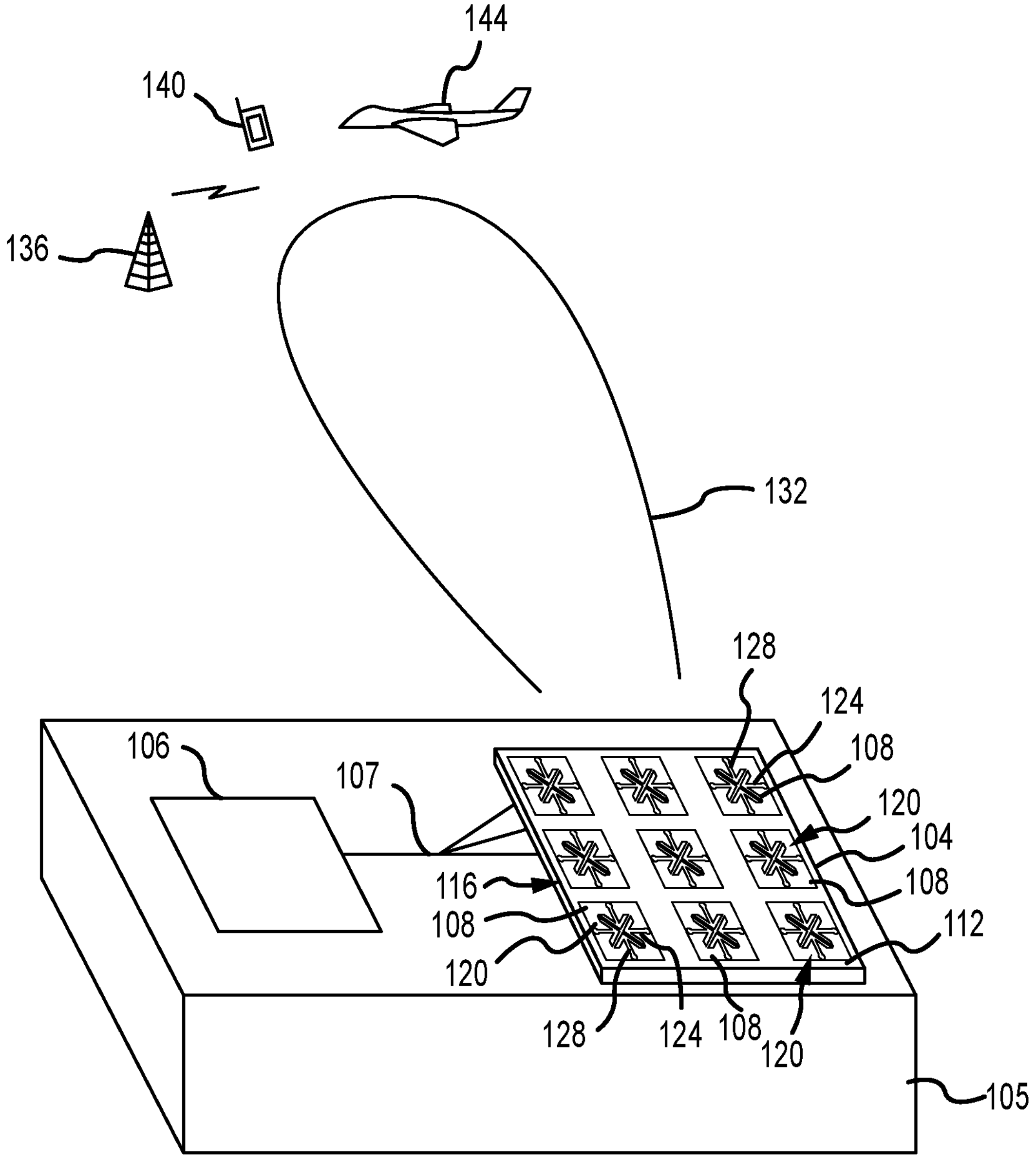
FIG. 1 depicts an antenna system including an antenna with an array of antenna elements in accordance with embodiments of the present disclosure in an example operational scenario.

As depicted in FIG. 1, an array antenna 104 in the form of a current sheet array in accordance with embodiments of the present disclosure can include multiple individual radiating elements or antenna elements 108, disposed on an antenna substrate 112 in the form of an array or matrix 116. Moreover, each element 108 can include pairs of dipole arms or elements 120. In particular, each element can include a horizontally polarized (H-pol) dipole arm pair 124 and a vertically polarized (V-pol) dipole arm pair 128. The array antenna 104 can be mounted to a platform 105, such as but not limited to a tower, aircraft, missile, ship, truck, spacecraft, or any other stationary structure or mobile device. In at least some embodiments, the platform 105 can include or be associated with a transceiver 106 or other communication, control, or operational equipment. The transceiver 107 can be connected to the antenna 104 by a feed network 107.

The elements 108 of an array antenna 104 in accordance with embodiments of the present disclosure can be operated to receive, transmit, or transmit and receive electromagnetic signals or beams 132. The electromagnetic signals 132 can include communication signals sent between the antenna 104 and communication system base stations 136, mobile devices 140, or other communication devices, signals sent as part of radar systems to determine the presence and location of distant objects 144, signals received from other transmission sources that the antenna is operational to detect as part of a signal or threat warning system, or any other purpose. In accordance with at least some embodiments of the present disclosure, signals associated with individual elements 108 can be phased relative to other elements to steer the beam 132. In accordance with still other embodiments of the present disclosure, signals associated with different dipole arm pairs 124 and 128 are orthogonally polarized from one another.

In some embodiments, a current sheet array antenna 104 may be an actively controlled array of antenna elements 108 configured to create a beam of radio waves 132 that may be electronically steered to point in a selected direction, without requiring the array antenna 104 to be physically moved. It should be appreciated that in some embodiments the current sheet array 104 may be designed to be physically moveable or stationary. In some embodiments, an array antenna 104 as described herein may be an active or passive phased array. Beamforming or spatial filtering may be used for directional signal transmission or reception by the array antenna 104. In some embodiments, adaptive beamforming may be used to detect and estimate a signal of interest. The signals 132 transmitted or received by the array antenna 104 may be of various wavelengths or bands of wavelengths.

In at least some embodiments, an array antenna 104 may be in communication with a computer or other control system 106. The computer system 106 may execute software configured to control signals transmitted by the array antenna 104 via a feed network 107. The computer system 106 may further be capable of processing signals received by the current sheet array antenna 104. In some embodiments, the antenna 104 may be used to transmit and/or receive signals 132 in a variety of directions at a single time. As described herein, the array antenna 104 may utilize a wide bandwidth and be capable of transmitting the signals 132 at frequencies not capable of being transmitted by conventional current sheet arrays. For example, each of the signals 132 may be one of a low-, mid-, and high-frequency signal. The current sheet array 104 may further be capable of detecting and receiving signals 132 of a wide range of frequencies. For example, in addition to or as opposed to transmitting signals, an array antenna 104 as described herein may further be configured to detect and/or receive signals 132.

Figure 2:
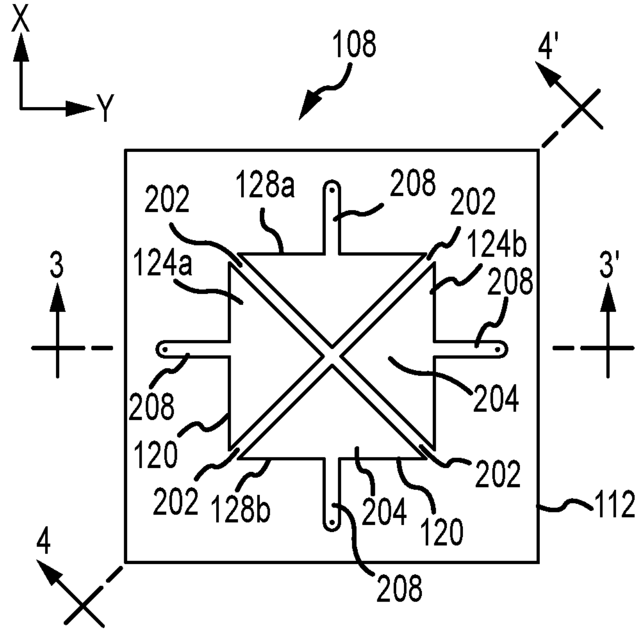
FIG. 2 depicts an antenna element in accordance with embodiments of the present disclosure in a plan view.

An example of an antenna element 108 in accordance with embodiments of the present disclosure is shown in a top plan view in FIG. 2. As shown, each antenna element 108 can include a number of dipole arms or elements 120, separated from one another by gaps 202. The dipole elements 120 are generally planar elements disposed along an X-Y plane. Each dipole element 120 is electrically conductive, and includes a radiating portion 204 and a feed portion 208. First 124 and second 128 pairs of dipole elements can be included in each antenna element 108. In accordance with embodiments of the present disclosure, the first pair 124 of dipole elements 120 can operate in connection with signals having a first polarization (e.g. a horizontal polarization), and the second pair 128 of dipole elements 120 can operate in connection with signals having a second polarization (e.g. a vertical polarization) that is orthogonal to the first polarization. As shown, the dipole elements 120 can be interspersed, such that a first one 124*a* of the first pair 124 of dipole elements 120 occupies a first quadrant of the element 108, a first one 128*a* of the second pair 128 of dipole elements 120 occupies a second quadrant of the element 108, a second one 124*b* of the first pair 124 of dipole elements 120 occupies a third quadrant of the element 108, and a second one 128*b* of the second pair 128 of dipole elements 120 occupies a fourth quadrant of the element 108.

In accordance with at least some embodiments of the present disclosure, each dipole element 120 can have a radiating portion 204 forming a generally triangular shape in a top plan view. Moreover, in combination, the dipole elements 120 within any one antenna element 108 can occupy a generally a square or rectangular area. The gaps 202 separating adjacent dipole elements 120 are defined by the edges of the adjacent elements 120. Moreover, those edges can be parallel to one another. Considered in combination, the gaps 202 of any one antenna element 108 can describe a generally X-shaped area. The feeds 208 can extend from an outer edge of the respective dipole elements 120, and generally serve to connect the dipole elements 120 to corresponding feed lines included in a feed network 107 provided as part of the array antenna 104, and further that connects the elements 120 of the array antenna to the transceiver or other system 106. As examples, but without limitation, feed lines can be provided as traces and/or vias formed within and/or adjacent an antenna substrate.

Figure 3:
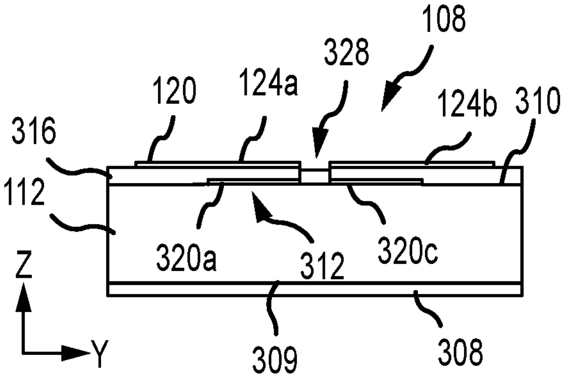
FIG. 3 depicts an antenna element in accordance with embodiments of the present disclosure in a cross-section view taken along section line 3-3' of FIG. 2.
Figure 4:
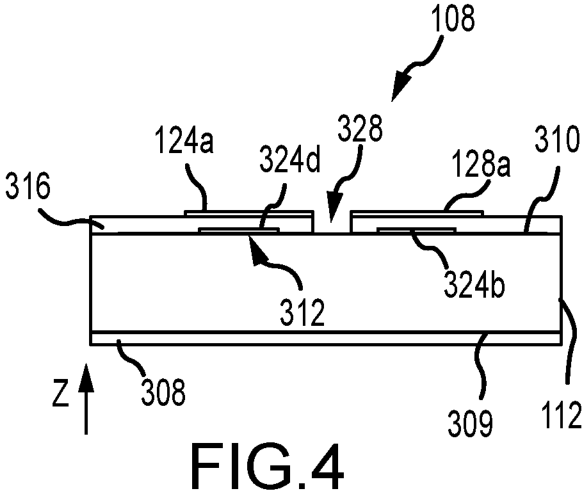
FIG. 4 depicts an antenna element in accordance with embodiments of the present disclosure in a cross-section view taken along section line 4-4' of FIG. 2.

FIG. 3 depicts an example antenna element 108 in accordance with embodiments of the present disclosure in a cross-section view taken along section line 3-3' of FIG. 2, and FIG. 4 depicts the example antenna element 108 in a cross-section view taken along section line 4-4' of FIG. 2. As shown in FIGS. 3 and 4, an antenna element 108 in accordance with embodiments of the present disclosure includes a dielectric antenna substrate 112, a ground plane 308 on a back surface side 309 of the antenna substrate 112, and the dipole elements 120 on a front surface side 310 of the antenna substrate 112. Furthermore, an antenna element 108 in accordance with embodiments of the present disclosure includes a resistive-capacitive (RC) loading plate structure 312 generally disposed between the dipole elements 120 and the dielectric substrate 112. In addition, a dielectric layer 316 separates at least portions of the dipole elements 120 from components of the RC loading plate structure 312.

Figure 5:
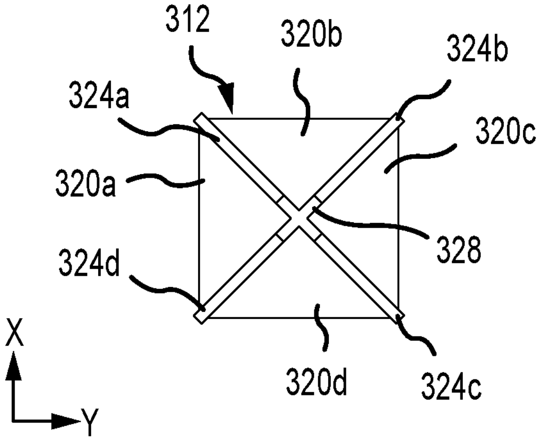
FIG. 5 depicts an RC loading plate in accordance with embodiments of the present disclosure in a plan view.

The RC loading plate structure 312, illustrated in plan view in FIG. 5, includes a set of conductive surfaces or elements 320, and a set of resistive surfaces or elements 324. A central gap portion or area 328 is formed at a center of the RC loading plate structure 312. The RC loading plate structure 312 components generally lie along an X-Y plane that is parallel to the X-Y plane along which the dipole elements 120 are located.

In general, one conductive surface 320 of the RC loading plate structure 312 is located adjacent each of the dipole elements 120. For example, a first conductive surface 320*a* may be located between the first one 124*a* of the first pair 124 of dipole elements 120 and the front surface side 310 of the dielectric substrate 112; a second conductive surface 320*b* may be located between the first one 128*a* of the second pair 128 of dipole elements and the front surface side 310 of the dielectric substrate 112; a third conductive surface 320*c* may be located between the second one 124*b* of the first pair 124 of dipole elements 120 and the front surface side 310 of the dielectric substrate; and a fourth conductive surface 320*d* may be located between the second one 128*b* of the second pair 128 of dipole elements 120 and the front surface side 310 of the dielectric substrate 112. In accordance with at least some embodiments of the present disclosure, the conductive surfaces 320 of the RC loading plate structure 312 are shaped and sized so as to mirror the radiating portions 204 of the corresponding dipole elements 120. For example, where the radiating portions 204 of the dipole elements 120 are triangular in plan view, the corresponding conductive surfaces or elements 320 are triangular in plan view. However, the conductive surface 320 need not exactly mirror the shape of the radiating portion 204 of the adjacent dipole elements 120. In addition, in combination, the conductive surfaces or elements 320 within an antenna element 108 can occupy a generally square or rectangular area. Moreover, the edges of the radiating portions 204 of the dipole elements 120 can be parallel to the edges of the corresponding conductive elements 320. The area of each conductive element 320 can be the same or about the same (e.g. +/−15%) as the area of the radiating portion 204 of an adjacent dipole element 120. As previously noted, each conductive surface 320 of the RC loading plate structure 312 can be separated from a corresponding dipole element 120 by a dielectric layer 316.

At least portions of adjacent conductive surfaces 320 within an RC loading plate structure 312 in accordance with embodiments of the present disclosure are separated from one another by a resistive surface or element 324. For example, a resistive surface 324 can be located in an area between each adjacent conductive surface 320. The areas in which the resistive surfaces 324 are disposed can correspond to at least a portion of the areas of the gaps 202 between adjacent dipole elements 120. In accordance with at least some embodiments of the present disclosure, each resistive surface 324 can extend from a first end adjacent the central gap area 328 to a second end. The second end of each resistive surface 324 can correspond to edges of the adjacent conductive surfaces 320, can extend past the edges of the adjacent conductive surfaces 320, and or can terminate closer to the central gap area 328 than the adjacent conductive surfaces 320.

An antenna element 108 in accordance with embodiments of the present disclosure can be formed using conventional manufacturing techniques. Such techniques can include, but are not limited to, printed circuit board (PCB) manufacturing techniques. Conductive elements, including the dipole elements 120 and the conductive surfaces 320 of the RC loading plate structure 312 can be formed from a metal. The resistive surfaces 324 of the RC the structure 312 can be formed from any insulating or dielectric material, including but not limited to dielectric films. The central gap area 328 of the RC loading plate structure 312 can be provided as an air gap. In accordance with other embodiments of the present disclosure, the central gap area 328 can be partially or entirely occupied by a dielectric material, such as a dielectric material having a different dielectric constant than the resistive surfaces 324.

As can be appreciated by one of skill in the art after consideration of the present disclosure, the dimensions of various components, such as the dipole elements 120, can be determined with reference to the anticipated operating wavelengths of the array antenna 104 incorporating the antenna element 108. The areas of the conductive surfaces 320 of the RC loading plate structure 312 can be selected to be the same in size and shape, or about the same in size and shape, as the adjacent dipole elements 120. Particular characteristics of the antenna element 108 performance can be tuned through the selection of the dielectric layer 316 and thickness, at least between the conductive surfaces 320 and the dipole elements 120. Tuning can also be accomplished through the selection of the size of the central gap area 328, the dielectric constant of a material (if any) located within the central gap area 328, the thickness of the substrate 112, the dielectric constant of the substrate 112, the dielectric constant of the resistive surfaces 324, and the like.

As discussed herein, an array antenna 104 in the form of a current sheet array incorporating antenna elements 108 in accordance with embodiments of the present disclosure includes an RC loading plate structure 312 as part of least some of the antenna elements 108. The conductive surfaces 320 of the RC loading plate structure 312 of an antenna element 108 capacitively couples with the dipole elements 120 of that antenna element 108. A portion of the current that flows through the resistive surfaces 324, which de-Q's the resonant circuit. This de-Q'ing broadens the bandwidth of the antenna element 108 at the expense of efficiency. By controlling the amount of capacitance between the dipole elements 120 and the conductive surfaces 320 of the RC loading plate structure 312, the amount of current through the resistive components 324 can be controlled. The de-Q'ing can be tuned to suit a particular bandwidth of interest. The dipole elements 120, the RC loading plate structure 312, and the support structure can all be made using traditional low cost printed circuit board manufacturing techniques.

Figure 6:
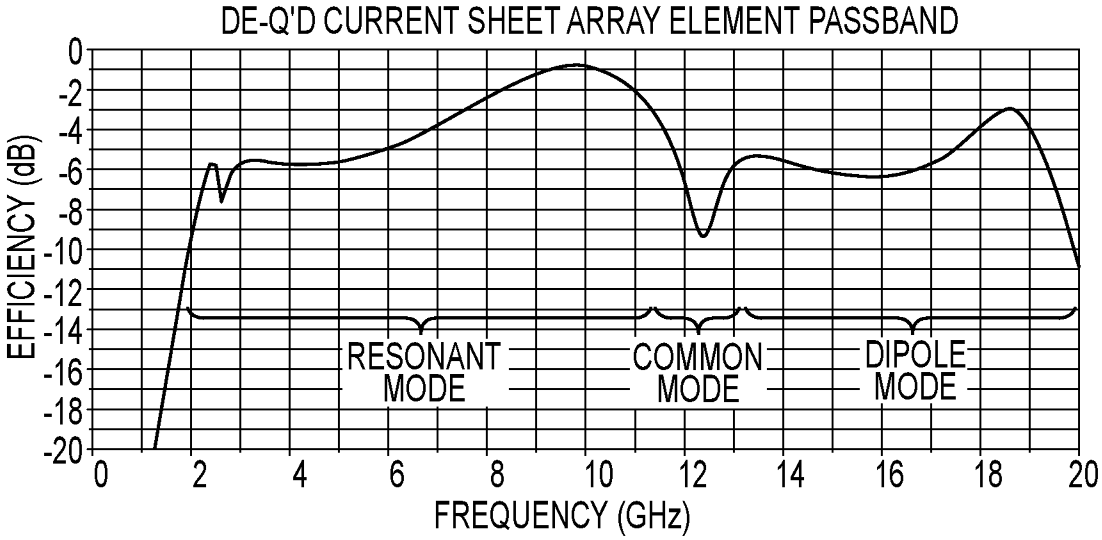
FIG. 6 depicts the antenna element efficiency of a current sheet array in accordance with other embodiments of the present disclosure.
Figure 7:
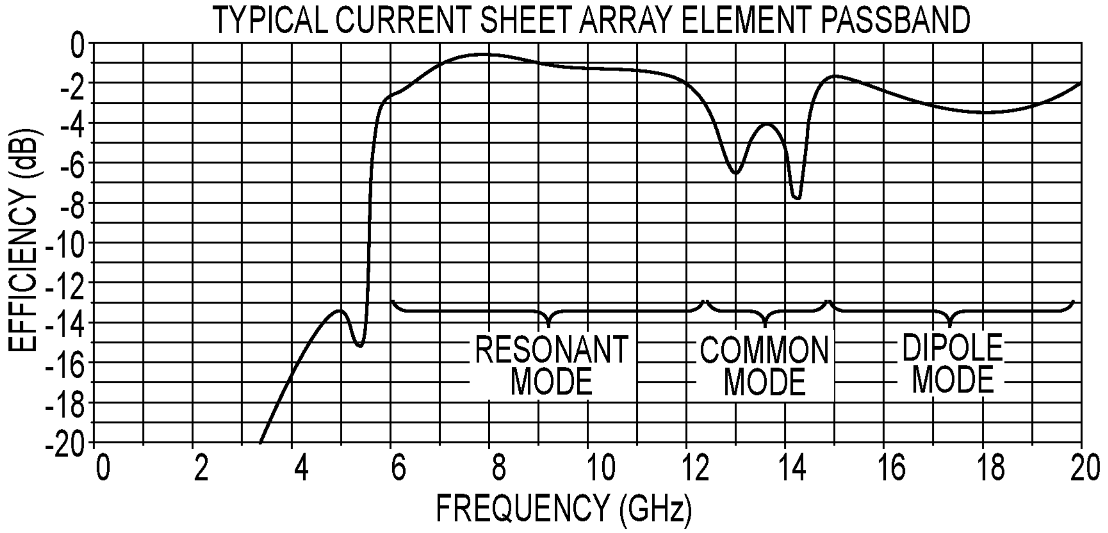
FIG.7 PRIOR ART
FIG. 7 depicts the antenna element efficiency of a current sheet array in accordance with the prior art.

FIG. 6 depicts the antenna element efficiency of a current sheet array in accordance with embodiments of the present disclosure. As depicted, the resonant mode of the antenna system 104 can be extended as compared to conventional designs. This extension of the antenna array 104 bandwidth is accompanied by a decrease in efficiency. However, this can be addressed through the addition of power. The extended bandwidth shown in this example can be seen through a comparison of that bandwidth to the bandwidth available from a current sheet array in accordance with the prior art, illustrated in FIG. 7. As can be seen from these figures, the prior art design does not provide as low a minimum operational frequency. More particularly, in these examples the bandwidth of the antenna according to embodiments of the present disclosure, which extends from 2-20 GHz, is greater than the bandwidth of the prior art antenna, which extends from 6-20 GHz. The average efficiency of the antenna according to embodiments of the present disclosure was only slightly decreased, from −3 dB to −6 dB.

Figure 8:
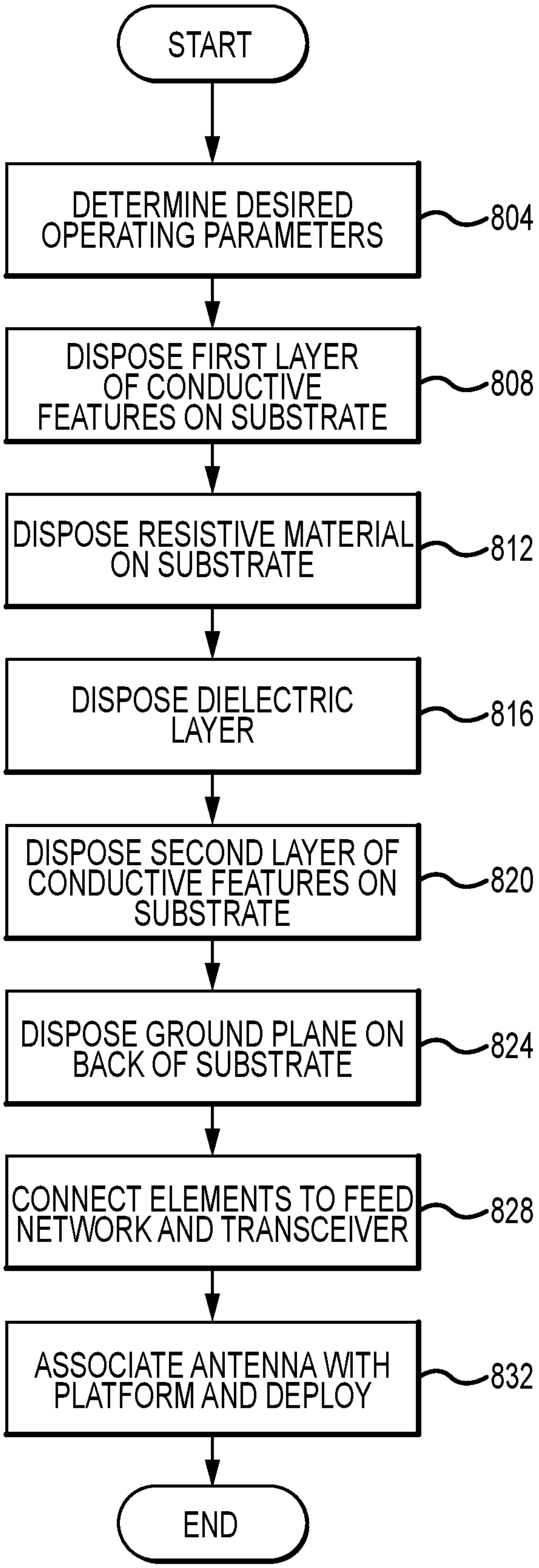
FIG. 8 is a flowchart depicting aspects of a method for providing an array antenna in accordance with embodiments of the present disclosure.

Aspects of a method for providing an array antenna 104 in accordance with embodiments of the present disclosure are depicted in FIG. 8. In particular, the method enables the provision of an array antenna 104 with an extended usable bandwidth as compared to various prior art techniques.

Initially, at step 804, the desired frequencies, steering capabilities, and/or other operational parameters of the antenna system 104 are determined. As can be appreciated by one of skill in the art after consideration of the present disclosure, such operational parameters at least partially determine the number of elements 108 within the array, and the configuration of each of the individual elements 108. In accordance with embodiments of the present disclosure, considerations concerning the configuration of the elements 108 include the dimensions of dipole arms 120, the dimensions of the loading plate structures 312, including the dimensions of the conductive surfaces 320 and the resistive surfaces 324, the spacing between the dipole arms 120 and associated conductive surfaces 320 (i.e. the thickness of the dielectric layer 316 between the dipole arms 120 and the conductive surfaces 320), the dimensions of the central gap portion 328, the thickness of the antenna substrate 112, the characteristics of the materials used to form the various elements, and the like.

At step 808, a first layer of conductive antenna 104 features can be disposed on the antenna substrate 112. This can include disposing conductive surfaces or elements 320 of loading plate structures 312 on the front surface 310 side of the antenna substrate 112 using an additive process, where a conductive material, such as aluminum or some other metal, is printed, deposited, or otherwise applied to the first surface 310 of the substrate 112. Alternatively or in addition, pattering the first conductive layer can include a subtractive process in which conductive material is removed from a conductive layer applied across all or portions of the first surface 310 of the substrate 112, to obtain the desired patterns of conductive elements 320.

At step 812, resistive features of the loading plate structures 312 can be disposed on the antenna substrate 112. This can include disposing resistive surfaces or elements 324 on the front surface 310 of the antenna substrate 112. For example, a resistive material forming the resistive elements 324 associated with each antenna element 108 can be disposed between adjacent sides of the included conductive elements 320, leaving the central gap portion 328 open (i.e. free of any resistive material). A dielectric layer 316 is then disposed over the first layer of conductive features and the resistive features, and over other areas of the front surface 310 of the antenna substrate 112 (step 816). In accordance with embodiments of the present disclosure, the dielectric layer 316 is formed to create a uniform front surface. Moreover, the surface formed by the dielectric layer 316 can be equidistant from the front surface 310 of the antenna substrate 112.

A second layer of conductive antenna 104 features can then be disposed on the dielectric layer 316 (step 820). This can include disposing dipole elements 120 and associated feeds 208 on the surface of the dielectric layer 316. A ground plane 308 can then be disposed on the back surface 309 side of the antenna substrate 112 (step 824). The feeds 208 can be connected to a transceiver via a feed network (step 828). As can be appreciated by one of skill in the art after consideration of the present disclosure, the process of patterning a first conductive layer and of providing a ground plane can include utilizing conventional printed circuit board (PCB) materials and processes. The array antenna 104 can then be associated with a platform and deployed (step 832). Although various steps of a method have been presented in a particular sequence, it should be appreciated that the steps discussed herein can be rearranged. In addition, different processes or combinations of processes can be used to form the antenna 104.

Although various figures provided as part of the present disclosure depict the front surface 310 of the antenna 104 as being planar, embodiments of the present disclosure are not limited to such a configuration. For example, the front surface 310 of the antenna substrate 112 can be curved or can be multifaceted, to provide or facilitate the provision of a conformal antenna 104 configuration.

The foregoing discussion of the disclosed systems and methods has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described herein are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. An array antenna, comprising:

a substrate;

a first antenna element disposed on a first surface side of the substrate, the first antenna element including:

a resistive-capacitive (RC) loading structure including a set of conductive surfaces and a set of resistive surfaces disposed on the first surface of the substrate;

a dielectric layer, wherein the dielectric layer is disposed on the first surface side of the substrate and over the RC loading structure;

dipole arms disposed on the dielectric layer and adjacent the first surface side of the substrate, wherein one conductive surface of the set of conductive surfaces is provided adjacent each of the dipole arms, wherein each conductive surface is spaced apart from a corresponding dipole arm by a portion of the dielectric layer, and wherein one resistive surface in the set of resistive surfaces is disposed adjacent at least a portion of a gap between each of the conductive surfaces; and a ground plane, wherein the ground plane is disposed on a second surface side of the substrate.

2. The array antenna of claim 1, further comprising:

a plurality of antenna elements, wherein the first antenna element is one of the plurality of antenna elements.

3. The array antenna of claim 2, wherein each antenna element in the plurality of antenna elements has a same configuration.

4. The array antenna of claim 1, wherein the dipole arms are disposed along a first plane, and wherein the RC loading structure is disposed along a second plane.

5. The array antenna of claim 4, wherein the second plane is between the first plane and the first surface side of the substrate.

6. The array antenna of claim 4, wherein a central gap area is disposed along at least the second plane and at a center of the first antenna element.

7. The array antenna of claim 1, wherein at least a radiating portion of the dipole arms have a triangular form in a plan view taken along a line perpendicular to the first surface of the substrate.

8. The array antenna of claim 7, wherein the conductive surfaces of the resistive-capacitive (RC) loading structure have a generally triangular form in the plan view.

9. The array antenna of claim 8, wherein the resistive surfaces have a generally rectangular form in the plan view.

10. The array antenna of claim 1, wherein the first antenna element is formed using a printed circuit board (PCB) process.

* * * * *